United States Patent
Nomoto et al.

(10) Patent No.: US 6,592,838 B1
(45) Date of Patent: Jul. 15, 2003

(54) ACTIVATED CARBON FOR USE IN ELECTRIC DOUBLE LAYER CAPACITOR AND METHOD OF PRODUCING THE SAME

(75) Inventors: Susumu Nomoto, Katano (JP); Kaneharu Yoshioka, Katano (JP); Eri Hirose, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 55 days.

(21) Appl. No.: 09/692,281

(22) Filed: Oct. 19, 2000

(30) Foreign Application Priority Data

Oct. 21, 1999 (JP) .............................. 11-300218

(51) Int. Cl.7 ............................................. C01B 31/00
(52) U.S. Cl. .................... 423/445 R; 502/427
(58) Field of Search ...................... 423/445 R; 502/416, 502/427; 361/502

(56) References Cited

U.S. PATENT DOCUMENTS

| | | | |
|---|---|---|---|
| 5,416,056 A | * | 5/1995 | Baker |
| 5,430,606 A | * | 7/1995 | Adachi et al. |
| 5,877,935 A | * | 3/1999 | Sato et al. |
| 5,891,822 A | * | 4/1999 | Oyama et al. |
| 5,956,225 A | * | 9/1999 | Okuyama et al. |
| 5,965,483 A | * | 10/1999 | Baker et al. |
| 5,969,936 A | * | 10/1999 | Kawasato et al. |
| 6,064,560 A | * | 5/2000 | Hirahara et al. |
| 6,291,069 B1 | * | 9/2001 | Noguchi et al. |
| 6,309,446 B1 | * | 10/2001 | Nakanoya et al. |
| 6,310,762 B1 | * | 10/2001 | Okamura et al. |

FOREIGN PATENT DOCUMENTS

| | | | |
|---|---|---|---|
| JP | 8-250379 | * | 9/1976 |
| JP | 61-102023 | | 5/1986 |
| JP | 63-187614 | | 8/1988 |
| JP | 03-812203 | | 8/1991 |
| JP | 5-258996 | | 10/1993 |
| JP | 7-220985 | | 8/1995 |
| JP | 8-51045 | | 2/1996 |
| JP | 2548546 | | 8/1996 |
| JP | 9-74053 | | 3/1997 |
| JP | 9-213590 | | 8/1997 |
| JP | 9-275042 | | 10/1997 |
| JP | 9-328308 | | 12/1997 |
| JP | 10-121336 | | 5/1998 |
| JP | 10-149958 | | 6/1998 |
| JP | 10-199767 | | 7/1998 |
| JP | 10-279303 | | 10/1998 |
| JP | 10-299392 | | 11/1998 |
| JP | 10-335188 | | 12/1998 |
| JP | 10-335189 | | 12/1998 |
| JP | 11-11921 | | 1/1999 |
| JP | 11-121299 | | 4/1999 |
| JP | 11-135380 | | 5/1999 |

* cited by examiner

*Primary Examiner*—Steven Bos
(74) *Attorney, Agent, or Firm*—RatnerPrestia

(57) ABSTRACT

Activated carbon for use in an electric double layer capacitor which has at least activated carbon, electrolyte solution and a separator, the activated carbon having properties of: the total specific surface area of 1000 $m^2/g$ or larger; the pore volume distribution of 400 $\mu l/g$ or larger for the pores larger than 12 Å and smaller than 40 Å in diameter and of 50 $\mu l/g$ or larger for the pores larger than 40 Å in diameter; and the total pore volume of 1000 $\mu l/g$ or smaller.

6 Claims, No Drawings

ACTIVATED CARBON FOR USE IN ELECTRIC DOUBLE LAYER CAPACITOR AND METHOD OF PRODUCING THE SAME

BACKGROUND OF THE INVENTION

1. Field of the Invention

The present invention relates to an electric double layer capacitor having a high capacitance density per electrode volume, excellent low temperature properties, and a high-current electricity discharging capability.

2. Related Art of the Invention

An electric double layer capacitor is a large-capacity capacitor using an activated carbon powder or an activated carbon fiber as a polarized electrode and also using an electric double layer created at the activated carbon—electrolyte solution interface. It is widely used for, for example, backup of microcomputers, memories and timers as a miniature, large-capacity capacitor.

The conventional electric double layer capacitors as described above are roughly divided into two types: those which use aqueous solution-based electrolyte solutions, such as aqueous solution of sulfuric acid, and those which use organic solvent-based electrolyte solutions, such as propylene carbonate, obtained by adding electrolytes to organic solvents.

The electric double layer capacitors is basically characterized by, for example, electrostatic capacitance, withstand voltage and internal resistance, and of them, electrostatic capacitance is the most important characteristic.

The principle of the electric double layer capacitors is using an electric double layer created at the electrode—electrolyte solution interface. The electrostatic capacitance of the ordinary plate capacitor is proportional to the area of the plates and is inversely as the distance between the plates; but on the other hand, for the electric double layer capacitors, the area of the electrode corresponds to the above area of the plates and the distance between the ions in the electrolyte solution and the electrons or holes in the electrode corresponds to the above distance between the plates.

Accordingly, it is obvious that the surface area of the electrode should be increased in order to increase the electrostatic capacitance. At present, the activated carbon having a specific surface area of as large as 1000 $m^2/g$ or more is used as the chief material of the electrode.

To produce activated carbon for use in the electric double layer capacitors, the process has been taken which is known as steam activation. The steam activation is a process in which, first, a carbon raw material (coconut shell, organic resin, petroleum pitch, etc.) is heated to 900 to 1000° C. in an inert gas, commonly in nitrogen gas to be carbonized, then steam is introduced and collided against the carbon raw material, so as to obtain a carbon material having an extremely high specific surface area (that is, activated carbon). For the activated carbon obtained by this steam activation process, however, there are limits to its capacitance density.

On the other hand, an alkali activation process has been devised in recent years which enable the attainment of capacitors with higher capacitance compared with in cases where the steam activation process is used.

Typical examples of the patents which refer to the alkali activation process and aim at attaining a larger-capacity capacitor include: for example, a process in which petroleum cork is added with a 2 to 4 times amount of sodium hydroxide then the mixture is subjected to temporary baking at 300 to 600° C. and activated at 700 to 1200° C., so that the specific surface area of the activated carbon, of which limits have been 1500 $m^2/g$ when adopting the steam activation process, is greatly improved to 2000 to 3500 $m^2/g$ and the yield is also improved (Japanese Patent No. 2548546); a process in which sodium hydroxide is added to coconut shells and the mixture is subjected to heat treatment at 400 to 500° C. (Japanese Patent Application Laid-Open No. 3-812203); a process in which petroleum pitch, as the carbon raw material, is subjected to melt spinning and activated with an aqueous solution of alkali metal hydroxide (Japanese Patent Application Laid-Open No. 5-258996); a process in which phenolic laminated sheets as the paper base are pulverized and carbonated at 500 to 900° C., then activated with alkali metal hydroxide at 400 to 900° C. (Japanese Patent Application Laid-Open No. 8-51045); a process in which a carbon material is activated with alkali metal hydroxide and subjected to heat treatment in an inert gas (Japanese Patent Application Laid-Open No. 9-213590); a process in which alkali metal compound is added to a mesophase pitch carbon fiber and the mixture is subjected to heat treatment at 550 to 900° C. (Japanese Patent Application Laid-Open No. 10-121336); a process in which petroleum cork or petroleum pitch is carbonated and, after controlling the volatile component produced and the atom ratio of hydrogen to carbon, subjected to alkali activation (Japanese Patent Application Laid-Open No. 10-199767); a process in which saccharide is subjected to dehydration and partial decomposition and activated at 700 to 1000° C. (Japanese Patent Application Laid-Open No. 10-335188); a process in which metal impalpable powder is previously added to saccharide and the mixture is activated (Japanese Patent Application Laid-Open No. 10-335189); halogenated resin is activated with a molten alkali salt (Japanese Patent Application Laid-Open No. 11-121299); and a process in which mesophase pitch of which surface is coated with a graphite laminated structure layer or is partially oxidized is activated with alkali metal hydroxide at 550 to 850° C. (Japanese Patent Application Laid-Open No. 11-135380). There is presented no detailed description on the pore distribution of the activated carbon after activation, as herein described later, in the documents above.

In the steam activation process which has a longer history than the alkali activation process, inventions have been made from the viewpoint of the pore distribution of the activated carbon. Typical examples of the patents include, for example, the activated carbon of which volume of the pores 20 Å or larger in inside diameter accounts for 40% or more (Japanese Patent Application Laid-Open No. 61-102023); carbon-based material of which specific surface area is 1800 to 3500 $m^2/g$, average pore diameter is 5 to 15 Å, and volume ratio of the pores 20 Å or larger in inside diameter to the total pores is 20 to 40% (Japanese Patent Application Laid-Open No. 63-187614); a process in which pores having a slit larger than the diameter of the solvated ion (Japanese Patent Application Laid-Open No.7-220985); the activated carbon of which specific surface area of the pores 20 Å or larger accounts for 10% or less (Japanese Patent Application Laid-Open No. 9-74053); the activated carbon having peaks at the inside diameters 10 to 20 Å and 20 to 100 Å (Japanese Patent Application Laid-Open No. 9-328308); the activated carbon which has a peak at the inside diameter of 8 Å or smaller and the pore diameter of 15 Å or small of which pore volume accounts for 65% or more (Japanese Patent Application Laid-Open No. 10-279303); and the activated carbon of which pore diameter is equal to or larger than the maximum ion diameter of electrolyte solution and smaller than the 5.0 fold diameter of the same (Japanese Patent Application Laid-Open No. 11-11921).

The inventions of controlling the pore distribution in the above steam activation process have been made mainly from the viewpoint of the energy density.

Meanwhile, devices capable of storing electrical energy just like the electric double layer capacitor include, for example, a secondary battery. Generally the electric double layer capacitor has a lower energy density than the secondary battery, and it has been used as a substitute of the secondary battery solely in the field where a long life is required, like an electrolytic capacitor. In recent years, however, there have been demands for the electric double layer capacitor to have excellent high-power output and low-temperature resistance in, for example, vehicle applications.

In such a situation, the present inventors concentrated their energy on investigating the steam or the requirements for the pore distribution of the catalyst activated carbon, using simulation, for materializing an electric double layer capacitor excellent in high-power output and low-temperature properties without sacrificing its energy density, and already found that the use of the activated carbon of which total specific surface area is 1000m$^2$/g or larger, pore radius is 10 Å or larger and 30 Å or smaller, and of which ratio of pore is 5% or more and 20% or less enables the attainment of a larger-capacity electric double layer capacitor having excellent low-temperature properties (Japanese Patent Application No. 10-299392).

The activated carbon obtained by the alkali activation process as described above generally has a high specific surface area compared with that of the steam activation process. If the electrostatic capacitance of an electric double layer capacitor is simply proportional to the specific surface area of activated carbon, the potassium hydroxide activated carbon which has specific surface area of as large as 3000 m$^2$/g, for example, should have electrostatic capacitance about 1.5 fold as large as that of the activated carbon obtained by the steam activation process which has specific surface area of 2000 m$^2$/g at the most. In actuality, however, when using the potassium hydroxide activated carbon as the electrode of the electric double layer capacitor, the electrostatic capacitance is increased indeed, but only to about 1.2 fold as large as that of the steam activation process at the most.

Thus, it is easy to think that the limits of the conventional alkali activation process that the electrostatic capacitance obtained is about 1.2 fold as large as that of the steam activation process at the most can be overcome by improving the pore distribution of the activated carbon.

Indeed, there have been provided methods of improving the pore distribution: for example, a method in which polyvinyl chloride is fired and subjected to alkali activation at 500 to 1000° C. so as to allow the most likelihood value of pore distribution of activated carbon obtained by the TEM image analysis to be in the range of 10 to 20 Å (Japanese Patent Application Laid-Open No. 9-275042) and a method in which the above most likelihood value is further improved (Japanese Patent Application Laid-Open No. 10-149958).

In the above-described two methods, the pore distribution of activated carbon was analyzed by the TEM image analysis while almost all of the other methods have been adopting the adsorption method using nitrogen which the present inventors also have adopted. TEM is a method in which the material is sliced and the image obtained by transmitting X-ray through the sliced material is observed; however, the sliced sample is an absolute minimum of 100 Å thick and it is not common to observe pores of 10 Å in diameter using a sample 100 Å thick. In addition, prior to the mage analyzation, the TEM image needs to be scanned with a scanner to be binarized. Thus, depending on the threshold having been set, the diameter of the most likelihood value of pore distribution may deviate by about 10 Å.

For the reasons described above, the application of the above-described two methods is limited to the polyvinyl chloride and they are not common methods. Furthermore, TEM image analysis is not a realistic method of identifying the pore distribution of activated carbon.

Thus, it can be said that there have existed no prior arts related to the alkali activation process in which the pore distribution of activated carbon is precisely and fully investigated in terms of the electrostatic capacitance, low-temperature resistance and high-current supplying property.

Therefore, in order to seek the requirements under which large capacity is achieved universally using the ordinary carbon materials, the present inventors have first produced alkali activated carbon having the above-described pore distribution requirements (10 Å or larger and 30 Å or smaller in pore radius, that is, 20 Å or larger and 60 Å or smaller in pore diameter) which they had found. However, although the present inventors tried to apply their patent, as described above, to alkali activated carbon, the object could not be achieved due to the problems described below.

(1) Deviation of the Pore Distribution Requirements

With the steam activated carbon, it seemed to be quite all right to consider that its large capacity was caused mostly by the pore diameter of larger than 20 Å and smaller than 60 Å; however, even though the pore distribution of the activated carbon was controlled in the above manner, the capacitance density per volume was hard to increase.

(2) Measures of Dealing with High-Current Discharge

As described later, the capacitor could be produced experimentally of which capacitance density was hardly decreased even at low temperatures; however, it was found that the capacity was decreased more rapidly than that obtained by the steam activation process when increasing the current value during constant-current discharging. As described later, this is attributed to the fact that, because the optimum pore diameter shifts to the small region compared with the case of the steam activation process, the capacity can be picked out when the current is low; but on the other hand, during the high-current discharging, since the apparent mobility in the electrolyte solution becomes low and this process is on diffusion-controlling, the capacitance cannot be picked out. It seems that this problem can be solved simply by controlling the pore diameter in such a manner as to shift to the larger region, however, but at the sacrifice of the capacitance density per volume.

(3) Activation Controlling Method

In the inventions to date, although differences in material do exist, they use common procedures: at a comparatively low temperature 400 to 700° C. Alkali is added to a carbon material in the ratio of about 0.5:1 to 10:1 in weight and activation is carried out for a long period of time. The procedures, however, allow the pore diameter to become larger than that actually needed.

After all, it can be said that the proper pore distribution of alkali activated carbon in terms of the electrostatic capacitance, low-temperature resistance and high-current supply has been unknown until now.

SUMMARY OF THE INVENTION

Accordingly, in light of the above problems, the object of the present invention is to provide activated carbon having a proper pore distribution in terms of the electrostatic capacitance, low-temperature resistance and high-current supply and a method of producing the same.

The means of solving the above three problems are shown below.

(1) Deviation of the Pore Distribution Requirements

After studying the correlation coefficient between the pore distribution and the capacitance density per weight of alkali activated carbon, it has been found that its large capacity is caused by the small pore diameter compared with that obtained by the steam activation process, in particular, by the pore diameter of larger than 12 Å and smaller than 40A.

It is clear that, since the surface of the alkali activated carbon is much more improved in wettability than the steam activated carbon, even the smaller pores contribute to the large capacity. This means more than the shift of the optimum pore diameter range, because the improvement in specific surface area in larger pores leads to increasing in pore volume, which in turn leads to decreasing in the density of an activated carbon electrode, and hence decreasing in capacitance density per volume.

Accordingly, although the upper limits of the specific surface area of the pores 20 Å or larger and 60 Å or smaller in diameter were defined as 5% or larger and 20% or smaller of the total specific surface area in the patents related to the steam activation process, the upper limits do not need to be defined particularly for the alkali activation process, and in the claims of the present invention the pore volume distribution is referred to as "400 $\mu$l/g or larger for the pores 12 Å or larger and 40 Å or smaller in diameter." In order to suppress the increase in capacitance density per volume, however, the requirement "the total pore volume is 1000 $\mu$l/g or smaller" should be met.

(2) Measures of Dealing with High-Current Discharge

The present inventors have found that the problem of dealing with the high-current discharge can be solved by increasing a little the pore volume of the pores having a larger diameter without changing the optimum range, that is the pore volume of the pores 12 Å or larger and 40 Å or smaller in diameter. Specifically, the requirement "400 $\mu$l/g or larger for the pores 12 Å or larger and 40 Å or smaller in diameter and 50 $\mu$l/g or larger for the pores 40 Å or larger in diameter" should be added.

This implies that the pores different from each other in diameter do not exist independently, but the smaller pores exist in larger pores as the secondary structures.

As described above, in the alkali activated carbon, the capacitance density, which could not be achieved by the alkali activation process of the prior arts, was achieved by controlling the pore radius. Here the requirements described above apply to all of the capacitance density per volume, low-temperature properties and high-current discharge properties. Generally the capacitance density per volume increases as the pore volume decreases; accordingly, when the low-temperature properties are required but the high-current discharge properties are not, the requirement "50 $\mu$/g or larger for the pores 40 Å or larger in diameter" is not necessary. Similarly, when the high-current discharge properties are required but the low-temperature properties are not, the requirement "400 $\mu$l/g or larger for the pores 12 Å or larger and 40 Å or smaller in diameter" is not necessary.

In accordance with the invention with respect to claim 5 the pore distribution, it's also possible to use steam activation etc. However, in the activated carbon other than the alkali activated carbon, the improvement in capacity by the above-described pore distribution cannot be expected compared with the conventional steam activated carbon unless the wettability of the activated carbon surface is improved, in such cases, taking means of, for example, subjecting the steam activated carbon to electrolytic oxidation and activating the same using a catalyst is effective.

(3) Activation Controlling Method

The present inventors directed their attention to the facts that, in the inventions to date, carbon is activated at relatively low temperatures (400 to 700° C.) compared with the steam activation process and the amount of alkali added is large (weight ratio of about 0.5 to 10). In order to allow smaller pores to grow, activation needs to be carried out quickly. And the problem in this activation controlling method was solved by activating carbon at raised temperatures and with a decreased amount of alkali so as to allow the activation to progress rapidly.

The present invention is applicable not only to the alkali activation process, but also to the activated carbon in general of which wettability can be improved, and the present invention is not intended to be limited. As long as the pore distribution requirements can be met, the present invention is also applicable to some other alkali activation processes or to the process in which the steam activated carbon is controlled to meet the pore distribution requirements and its wettability is improved by the treatments such as electrolytic oxidation.

PREFERRED EMBODIMENTS OF THE INVENTION

The preferred embodiments of the present invention will be described below.

A phenolic woven material was used as a raw material. However, other forms (powder etc.) of the same phenolic resin and some other materials, such as coconut shell, petroleum pitch and petroleum coke, may be used as the raw material.

First the phenolic woven material was cut into pieces about 1 mm×1 mm in size and 2 g of the same was weighed. The weighed material was put into a quartz heat-resisting crucible, sodium hydroxide of such amount described in Table 1, is added, and a small amount of water was added while stirring the mixture lightly until paste was obtained. This paste was placed in an electric furnace in which nitrogen flow could be carried out and nitrogen was allowed to flow at a speed of 10 L/min previously.

Then the paste was heated to a set temperature over 30 minutes, held for a specified period of time and subjected to activation. After that, the paste was cooled over 30 minutes. After being cooled to room temperature, the activated carbon produced and the alkali residue were fully washed away with water.

At a time when the pH value of the washing liquid is 7, vacuum impregnation and normal pressure were repeated while soaking the activated carbon in water. After being completely washed in micro-pores, the activated carbon was put into a ball mill containing zirconia balls 5 mm in radium and pulverized into powder 4 to 6 microns in size. The powder was dried at 150° C. so as to be an activated carbon sample.

For the activated carbon material obtained in the above manner, adsorption isotherm by nitrogen adsorption at the temperature of liquid nitrogen was measured. The specific surface area was determined by a single-point determination using a value at a relative pressure of 0.3 in accordance with the BET equation. The total pore volume was determined by extrapolating the point at which the relative pressure is 1 in the adsorption isotherm. The pore distribution was determined by the Cranston-Inkley method and the differential pore volumes were calculated for the pores 12 to 40 in diameter and those 40 or larger in diameter; respectively.

For the activated carbon powder obtained in the above manner, the electrostatic capacitance was measured by the method described below.

140 mg of the activated carbon was mixed with 40 mg of acetylene black, as a conductive material, 20 mg of polytetrafluoroethylene, as a binder, and 1 cc of methanol, and the mixture was thinned down in an agate mortar so as to form paste. Then the paste was cut into several mm squares with scissors and compressed with a pressing machine so as to obtain disc-line electrode bodies. The disc-line electrode bodies obtained were dried at 150° C. for 7 hours or longer, followed by cooling to room temperature.

The electrode bodies were impregnated with a propylene carbonate solution of 0.5 mol of tetraethylammoniumtetrafluoro borate as the electrolyte solution, and faced to each other via a separator, so as to create a cell for evaluating an electric double layer capacitor. A platinum electrode for picking out electric charges was brought into contact with an electric charge collector using a spring and fixed thereto with a TEFLON® fluoropolymer resin holder. If water is mixed with the electrolyte solution, the properties cannot be correctly evaluated; accordingly, the evaluation was conducted while isolating the joint of the TEFLON® fluoropolymer resin holder from the open air with an insulating tape or a silicon caulking material. The evaluation results are shown below.

(1) Room-temperature Properties

The capacitor produced experimentally was allowed to stand in a constant temperature bath at 20° C. for 30 minutes or longer, then subjected to constant-potential charge at 2.5 V for 30 minutes. One minute after the completion of the charge, constant-current discharge was carried out at 10 mA. The electrostatic capacitance was calculated from the duration of the voltage decreasing from 1.0 V to 0.5 V using the discharge curve obtained.

(1) Low-temperature Properties

The capacitor produced experimentally was allowed to stand in a constant temperature bath at −40° C. for 1 hour or longer, then subjected to constant-potential charge at 2.5 V for 30 minutes. One minute after the completion of the charge, constant-current discharge was carried out at 10 mA. The electrostatic capacitance was calculated from the duration of the voltage decreasing from 1.0 V to 0.5 V using the discharge curve obtained.

(1) High-current Properties

The capacitor produced experimentally was allowed to stand in a constant temperature bath at 20° C. for 30 minutes or longer, then subjected to constant-potential charge at 22.5 V for 30 minutes. One minute after the completion of the charge, constant-current discharge was carried out at 100 mA. The electrostatic capacitance was calculated from the duration of the voltage decreasing from 1.0 V to 0.5 V using the discharge curve obtained.

The activation conditions, activated carbon properties and capacitor properties for each example of the present invention obtained from the above measurements and those of the prior art example are shown in Table 1.

TABLE 1

| | Activation Conditions | | | Activated Carbon Properties | | | | Capacitor Properties | | | |
|---|---|---|---|---|---|---|---|---|---|---|---|
| | | | Dura- | Specific | | | | | | Low | |
| | | Tempera- | tion | Surface | Pore Volume | | | Room | | Tempera- | High |
| | Weight | ture | Dura- | Area | Total | 12~40 | 40~ | Temperature | | ture | Current |
| | Ratio | °C. | tion | m²/g | μl/g | μl/g | μl/g | F/g | F/cc | F/g | F/g |
| Example of Prior Art | 2 | 750 | 2 | 1500 | 900 | 350 | 30 | 50 | 18 | 20 | 27 |
| Example-1 | 2 | 770 | 1.7 | 1460 | 920 | 380 | 35 | 52 | 17 | 31 | 28 |
| Example-2 | 2 | 790 | 1.3 | 1530 | 950 | 420 | 38 | 51 | 17 | 40 | 32 |
| Example-3 | 2 | 810 | 1 | 1510 | 1000 | 500 | 43 | 53 | 15 | 43 | 36 |
| Example-4 | 2 | 830 | 0.8 | 1520 | 1050 | 560 | 47 | 54 | 16 | 42 | 38 |
| Example-5 | 2 | 850 | 0.7 | 1480 | 1120 | 600 | 52 | 53 | 14 | 43 | 47 |
| Example-6 | 1.5 | 820 | 0.7 | 1520 | 930 | 520 | 45 | 52 | 18 | 41 | 32 |
| Example-7 | 2 | 800 | 1 | 1495 | 970 | 560 | 70 | 53 | 17 | 43 | 51 |
| Example-8 | 2.3 | 820 | 1.7 | 1505 | 1020 | 580 | 105 | 54 | 15 | 44 | 50 |

In the examples 1 to 5, the pore volume of the pores 12 to 40 Å in diameter was controlled by raising the temperature while fixing the weight ratio. In the examples of the present invention, the specific surface areas were made uniform, about 1500m²/g, by controlling the activation duration. Generally, the differential pore volume at this region tends to increase with the increase in temperature; however, the relation between the pore distribution and the capacity properties does not change even if the pore volume is controlled by other conditions.

The results show that the low-temperature properties are improved by increasing the pore volume of the pores 12 to 40 Å in diameter little by little and the capacitance density does not decrease at room temperature when the pore volume exceeds 400 μl/g. Under these conditions, however, the pore volume of pores 40 Å or larger in diameter is relatively small and the high-current discharge properties are not very satisfactory. In addition, since the total pore volume increases with the increase in the pore volume of pores 12 to 40 Å in diameter, the capacitance density per volume at room temperature is gradually decreased. The density of the electrode body does not depend on the pore distribution, but it is inversely as the total pore volume; accordingly, in spite of the activation conditions of the present examples, a smaller pore volume is more preferable.

In the examples 6 to 8, the pore volume of the pores 40 Å or larger in diameter was controlled by varying the weight ratio and the activation duration. In the examples of the present invention, like the examples 1 to 5, the specific surface areas were made uniform, 1500 m$^2$/g, for easier comparison. Generally, the differential pore volume at this region tends to increase with the increase in activation duration and weight ratio; however, as in the examples 1 to 5 the relation between the pore distribution and the capacity properties does not change even if the pore volume is controlled by other conditions.

The results show that the high-current discharge properties are improved by increasing the pore volume of the pores 40 Å or larger in diameter little by little and the capacitance density does not change at discharge of 10 mA when the pore volume exceeds 50 µl/g. In these examples, too, since the total pore volume increases with the increase in the pore volume of pores 40 Å or larger in diameter, the capacitance density per volume at room temperature is gradually decreased.

Lastly, the comparison of all the examples shows that the increase in the pore volume of each of the pores 12 to 40 Å in diameter and the pores 40 Å or larger in diameter is the cause of the increase in the total pore volume, and hence of the decrease in capacitance density per volume.

Accordingly, when the low-temperature properties and the high-current discharge properties do not need to be satisfied at the same time, the capacitance density per volume can be improved by decreasing the pore volume of the pores at the region not needed, as can be seen from Table 1. Since the capacitance density per volume limit is about 15 F/cc in the steam activation process, the total pore volume is desirably 1000 µl/g or smaller.

As described above, according to the present invention, the capacitance density per volume of activated carbon, which is one component of an electric double layer capacitor, can be improved while maintaining the properties, such as low-temperature properties and high-current discharge properties, required for the electric double layer capacitor by controlling its pore distribution while varying the activation conditions.

What is claimed is:

1. A method for producing activated carbon for use in an electric double layer capacitor comprising the steps of:
   mixing sodium hydroxide and a phenolic resin in the ratio of 1–3 to 1 by weight; and
   heating the resulting mixture in a nitrogen atmosphere in the temperature range of 770 to 1000° C. for 4 hours or less.

2. The method of claim 1 in which heating is carried out between 770° C. to 850° C.

3. The method of claim 2 in which heating is carried out for 1.7 hours or less.

4. The method of any of claims 1–3 in which activated carbon has a low temperature electrostatic capacitance of 31 F/g to 44 F/g and a high current electrostatic capacitance of 28 F/g to 51 F/g.

5. The method of any of claims 1–3 in which activated carbon has a low temperature electrostatic capacitance of 40 F/g to 44 F/g and a high current electrostatic capacitance of 32 F/g to 51 F/g.

6. The method of any of claims 1–3 in which activated carbon has a total specific surface area of 1000 m$^2$/g or larger; a pore volume of 400 µl/g or larger for the pores larger than 12 Å in diameter and smaller than 40 Å in diameter; a pore volume of 50 µl/g or larger for the pores larger than 40 Å in diameter; and a total pore volume of 1000 µl/g or less.

* * * * *